(12) United States Patent
Masuda

(10) Patent No.: US 9,299,495 B2
(45) Date of Patent: Mar. 29, 2016

(54) CAPACITOR

(71) Applicant: Taiyo Yuden Co., Ltd., Tokyo (JP)

(72) Inventor: Hidetoshi Masuda, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 156 days.

(21) Appl. No.: 14/096,938

(22) Filed: Dec. 4, 2013

(65) Prior Publication Data

US 2014/0153157 A1 Jun. 5, 2014

(30) Foreign Application Priority Data

Dec. 5, 2012 (JP) .................................. 2012-266476

(51) Int. Cl.
| H01G 4/008 | (2006.01) |
| H01G 4/30 | (2006.01) |
| H01G 4/01 | (2006.01) |
| H01G 4/012 | (2006.01) |
| H01G 4/12 | (2006.01) |
| H01G 4/232 | (2006.01) |

(52) U.S. Cl.
CPC .................. *H01G 4/01* (2013.01); *H01G 4/012* (2013.01); *H01G 4/12* (2013.01); *H01G 4/232* (2013.01); *H01G 4/30* (2013.01)

(58) Field of Classification Search
USPC ............................. 361/303, 301.4, 305, 306.3
See application file for complete search history.

(56) References Cited

U.S. PATENT DOCUMENTS

| 2009/0086404 A1 | 4/2009 | Masuda et al. | |
| 2012/0017408 A1 | 1/2012 | Masuda et al. | |
| 2013/0148259 A1* | 6/2013 | Masuda et al. | 361/303 |

FOREIGN PATENT DOCUMENTS

| JP | 2000-049046 A | 2/2000 |
| JP | 2004-072034 A | 3/2004 |
| JP | 2007-201022 A | 8/2007 |
| JP | 2009-088034 A | 4/2009 |
| WO | WO 2012002083 A1 * | 1/2012 |

OTHER PUBLICATIONS

Office Action dated Sep. 5, 2014 in Japanese Application No. 2012-266476.

Office Action dated Dec. 12, 2014 in Korean Application No. 10-2013-0149042.

* cited by examiner

*Primary Examiner* — Eric Thomas
(74) *Attorney, Agent, or Firm* — Saliwanchik, Lloyd & Eisenschenk

(57) ABSTRACT

A capacitor includes a dielectric layer having a first plane, a second plane opposite to the first plane, and a plurality of through-holes communicated with the first and second planes; a first external electrode layer disposed on the first plane; a second external electrode layer disposed on the second plane; a first internal electrode having first and second electrode portions, the first and second electrode portions being formed of a first conductive material, and a second conductive material, respectively, the second electrode material connecting the first electrode portion with the first external electrode layer, the second conductive material having a smaller Young's modulus than the first conductive material, the first internal electrode being formed in a part of the plurality of through-holes; and a second internal electrode formed in another part of the plurality of through-holes, the second internal electrode being connected to the second external electrode layer.

7 Claims, 15 Drawing Sheets

| | Type | Young's modulus GPa | Resistivity uohm cm |
|---|---|---|---|
| Second conductive material Fourth conductive material | In | 11 | 8.4 |
| | Sn | 50 | 11.5 |
| | Pb | 16 | 20.8 |
| | Cd | 50 | 7.3 |
| | Bi | 32 | 129 |
| | Al | 70 | 28.2 |
| First conductive material Third conductive material | Cu | 128 | 1.7 |
| | Ni | 200 | 6.9 |
| | Au | 79 | 2.2 |
| | Ag | 83 | 1.6 |
| | Pt | 168 | 10.5 |
| | Pd | 121 | 10.5 |
| | Co | 209 | 6.2 |
| | Cr | 279 | 12.5 |
| | Fe | 211 | 9.6 |
| | Zn | 108 | 5.9 |

FIG.6

| | Electrode portion of internal electrode | Material | Young's modulus (GPa) | Ratio of capacitors having fluctuation rate of capacity value of not less than -5% after thermal history (N=1000) |
|---|---|---|---|---|
| Example 1 | Second and fourth electrode portions | Sn | 50 | 0.0% |
| | First and third electrode portions | Ni | 200 | |
| Example 2 | Second and fourth electrode portions | Sn-9%Zn-0.1%Al | 36 | 0.0% |
| | First and third electrode portions | Ni | 200 | |
| Example 3 | Second and fourth electrode portions | Sn-4%Ag-1%Cu | 31 | 0.0% |
| | First and third electrode portions | Ni | 200 | |
| Example 4 | Second and fourth electrode portions | Sn-58%Bi-1%Ag | 24 | 0.0% |
| | First and third electrode portions | Ni | 200 | |
| Example 5 | Second and fourth electrode portions | Bi | 32 | 0.0% |
| | First and third electrode portions | Ni | 200 | |
| Example 6 | Second and fourth electrode portions | Sn | 50 | 0.0% |
| | First and third electrode portions | Cu | 128 | |
| Example 7 | Second and fourth electrode portions | Al | 70 | 0.0% |
| | First and third electrode portions | Cu | 128 | |
| Example 8 | Second and fourth electrode portions | Al | 70 | 0.1% |
| | First and third electrode portions | Ni | 200 | |
| Example 9 | Second electrode portion | Al | 70 | 0.2% |
| | Fourth electrode portion | None | – | |
| | First and third electrode portions | Ni | 128 | |

FIG.16

| | Electrode portion of internal electrode | Material | Young's modulus (GPa) | Ratio of capacitors having fluctuation rate of capacity value of not less than -5% after thermal history (N=1000) |
|---|---|---|---|---|
| Example 10 | Second and fourth electrode portions | Cd | 50 | 0.0% |
| | First and third electrode portions | Cu | 128 | |
| Example 11 | Second and fourth electrode portions | In | 11 | 0.0% |
| | First and third electrode portions | Ag | 83 | |
| Example 12 | Second and fourth electrode portions | Pb | 16 | 0.0% |
| | First and third electrode portions | Pt | 168 | |
| Comparative example 1 | All electrodes include Ni | | 200 | 1.4% |
| Comparative example 2 | All electrode include Cu | | 128 | 1.2% |

FIG.17

CAPACITOR

CROSS-REFERENCE TO RELATED APPLICATION

This application claims the benefit under 35 U.S.C. §119 of Japanese Patent Application No. 2012-266476, filed Dec. 5, 2012, which is hereby incorporated by reference in its entirety.

BACKGROUND

The present disclosure relates to a porous capacitor.

In recent years, as a new type of capacitor, a porous capacitor has been developed. The porous capacitor takes advantage of the tendency of a metal oxide formed on a surface of a metal such as aluminum to form a porous structure. The porous capacitor is configured by forming internal electrodes in pores and using the metal oxide as a dielectric.

External conductors are laminated on front and back surfaces of the dielectric. The internal electrodes formed in the pores are connected to either the external conductors on the front surface or the external conductors on the back surface. The external conductors not connected to the internal electrodes are insulated by a void or an insulating material. In this way, the internal electrodes function as counter electrodes (positive electrode or negative electrode) facing each other via the dielectric.

For example, Japanese Patent No. 4493686 (Patent Document 1) and Japanese Patent Application Laid-open No. 2009-76850 (Patent Document 2) each disclose a porous capacitor having such a configuration. In any of Patent Documents, the internal electrodes are formed in the pores, one end of the internal electrodes is connected to one of the conductors, and the other end is insulated from the other conductor.

BRIEF SUMMARY

The above-mentioned porous capacitor is expected to maintain mechanical or electrical properties with respect to a thermal stress (caused due to temperature difference and different thermal expansion coefficients in different connected materials). In particular, there have been concerns that both end portions of the internal electrode is removed from the dielectric due to a thermal stress in some cases, which reduces the capacity value. In particular, if the end portion of the internal electrode is removed from the dielectric on the side connected to the external conductor, the internal electrode becomes unstable and is disconnected from the external conductor in some cases, which can reduce the capacity value further.

In view of the circumstances as described above, it is desirable to provide a porous capacitor in which the internal electrode is hard to be removed and the fluctuation of the capacity value is small.

According to an embodiment of the present disclosure, there is provided a capacitor including a dielectric layer, a first external electrode layer, a second external electrode layer, a first internal electrode, and a second internal electrode.

The dielectric layer has a first plane, a second plane opposite to the first plane, and a plurality of through-holes communicated with the first plane and the second plane.

The first external electrode layer is disposed on the first plane.

The second external electrode layer is disposed on the second plane.

The first internal electrode has a first electrode portion and a second electrode portion, the first electrode portion being formed of a first conductive material, the second electrode portion being formed of a second conductive material, the second electrode material connecting the first electrode portion with the first external electrode layer, the second conductive material having a smaller Young's modulus than the first conductive material, the first internal electrode being formed in a part of the plurality of through-holes.

The second internal electrode is formed in another part of the plurality of through-holes, the second internal electrode being connected to the second external electrode layer.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 6 is a table showing elements that can be used as a material of each electrode portion constituting the first internal electrode and the second internal electrode of the capacitor, and the physical properties;

FIG. 16 is a table showing the structure of capacitors according to examples of the present disclosure, and the experimental results; and FIG. 17 is a table showing the structure of capacitors according to examples and comparative examples of the present disclosure, and the experimental results.

DETAILED DESCRIPTION

Figure 1:
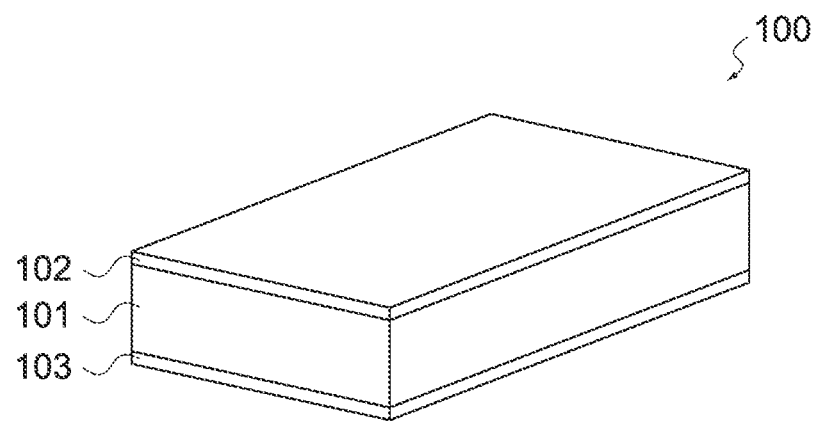
FIG. 1 is a perspective view of a capacitor according to an embodiment of the present disclosure.

A capacitor according to an embodiment of the present disclosure includes a dielectric layer, a first external electrode layer, a second external electrode layer, a first internal electrode, and a second internal electrode.

The dielectric layer has a first plane, a second plane opposite to the first plane, and a plurality of through-holes communicated with the first plane and the second plane.

The first external electrode layer is disposed on the first plane.

The second external electrode layer is disposed on the second plane.

The first internal electrode has a first electrode portion and a second electrode portion, the first electrode portion being formed of a first conductive material, the second electrode portion being formed of a second conductive material, the second electrode material connecting the first electrode portion with the first external electrode layer, the second conductive material having a smaller Young's modulus than the first conductive material, the first internal electrode being formed in a part of the plurality of through-holes.

The second internal electrode is formed in another part of the plurality of through-holes, the second internal electrode being connected to the second external electrode layer.

With this configuration, the first internal electrode and the second internal electrode, which face each other via the dielectric layer, function as counter electrodes of the capacitor. The first internal electrode and the second internal electrode are connected to the first external electrode layer and the second external electrode layer, respectively, and are connected to the outside (connection terminal or the like) via the layers. Here, in the first internal electrode, by disposing the second electrode portion formed of the second conductive material having a small Young's modulus at the connection portion with the first external electrode layer, it is possible to alleviate the stress caused between the first internal electrode and the dielectric layer. Accordingly, it is possible to prevent the capacity value characteristics from being reduced by a structural problem caused due to a thermal stress (removal of the first internal electrode from the dielectric layer or disconnection between the first internal electrode and the first external electrode layer), for example. Moreover, because the first internal electrode has the first electrode portion having a large Young's modulus, the first internal electrode can have a small electrical resistance. This is because a conductive material having a large Young's modulus generally has a small electrical resistance. Specifically, because the first internal electrode of the capacitor according to this embodiment has the first electrode portion formed of a material having a large Young's modulus (first conductive material) and the second electrode portion formed of a material having a small Young's modulus (second conductive material), it is possible to improve the resistance to the thermal stress while maintaining the element characteristics such as equivalent series resistance (ESR).

The second internal electrode may have a third electrode portion and a fourth electrode portion, the third electrode portion being formed of a third conductive material, the fourth electrode portion being formed of a fourth conductive material, the fourth electrode portion connecting the third electrode portion with the second external electrode layer, the fourth conductive material having a smaller Young's modulus than the third conductive material.

With this configuration, it is possible to alleviate the stress caused between the second internal electrode and the dielectric layer, similarly to the above-mentioned first internal electrode. Specifically, it is possible to alleviate the stress in the first internal electrode and the second internal electrode, and to improve the resistance to the thermal stress of the capacitor further.

The second conductive material and the fourth conductive material may include at least one element selected from the group consisting of In, Sn, Pb, Cd, Bi, and Al.

These materials have a small Young's modulus and are suitable as the second conductive material and the fourth conductive material according to this embodiment. It should be noted that the second conductive material and the fourth conductive material may be the same material or different materials.

The first conductive material and the third conductive material may include at least one element selected from the group consisting of Cu, Ni, Au, Ag, Pt, Pd, Co, Cr, Fe, and Zn.

These materials have a small electrical resistance and is suitable as the first conductive material and the third conductive material according to this embodiment. It should be noted that the first conductive material and the third conductive material may be the same material or different materials.

The second conductive material and the fourth conductive material may have a Young's modulus of not more than 70 GPa.

If the second conductive material and the fourth conductive material have a Young's modulus of not more than 70 GPa, it is possible to sufficiently alleviate the stress. It should be noted that a pure metal of an element that can be used as the above-mentioned second conductive material and the fourth conductive material (In, Sn, Pb, Cd, Bi, and Al) has a Young's modulus of not more than 70 GPa.

The dielectric layer may include a material in which a through-hole is formed by anode oxidation effect.

With this configuration, it is possible to form a dielectric layer having a through-hole through an anode oxidation process, and to produce the capacitor having the above-mentioned structure.

The dielectric layer may include aluminum oxide.

A through-hole is formed in the aluminum oxide, which is obtained by anodically oxidizing aluminum, by the self-organizing effect through an oxidation process. Specifically, by anodically oxidizing aluminum, it is possible to form a dielectric layer having a through-hole.

Hereinafter, embodiments according to the present disclosure will be described with reference to the drawings.

Configuration of Capacitor

Figure 2:
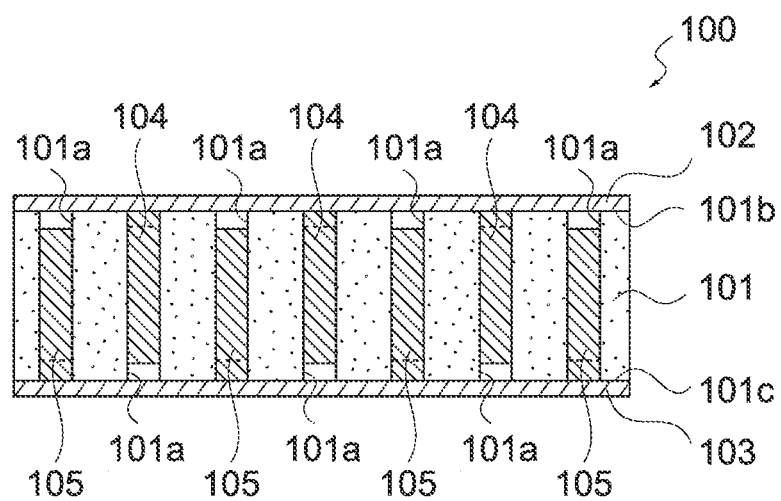
FIG. 2 is a cross-sectional view of the capacitor.

FIG. 1 is a perspective view showing a capacitor 100 according to an embodiment of the present disclosure. FIG. 2 is a cross-sectional view of the capacitor 100. As shown in these figures, the capacitor 100 has a dielectric layer 101, a first external electrode layer 102, a second external electrode layer 103, first internal electrodes 104, and second internal electrodes 105.

The first external electrode layer 102, the dielectric layer 101, and the second external electrode layer 103 are laminated in the stated order. In other words, the dielectric layer 101 is sandwiched between the first external electrode layer 102 and the second external electrode layer 103. As shown in FIG. 2, the first internal electrodes 104 and the second internal electrodes 105 are formed within through-holes 101a formed in the dielectric layer 101. It should be noted that the capacitor 100 may have configurations other than those shown here. For example, wirings connected to the first external electrode layer 102 or the second external electrode layer 103 may be formed on the capacitor 100.

The dielectric layer 101 functions as a dielectric of the capacitor 100. The dielectric layer 101 can be made of a dielectric material capable of forming through-holes (pores) to be described later. In particular, it is favorable to use a material that can provide pores by the self-organizing effect when the material is anodically oxidized. Examples of such a material include aluminum oxide ($Al_2O_3$). Also, the dielectric layer 101 may be made of an oxide of a valve metal (Al, Ta, Nb, Ti, Zr, Hf, Zn, W, and Sb). The thickness of the dielectric layer 101 is not particularly limited. For example, the dielectric layer 101 may have a thickness of several µm to several hundreds µm.

Figure 3:
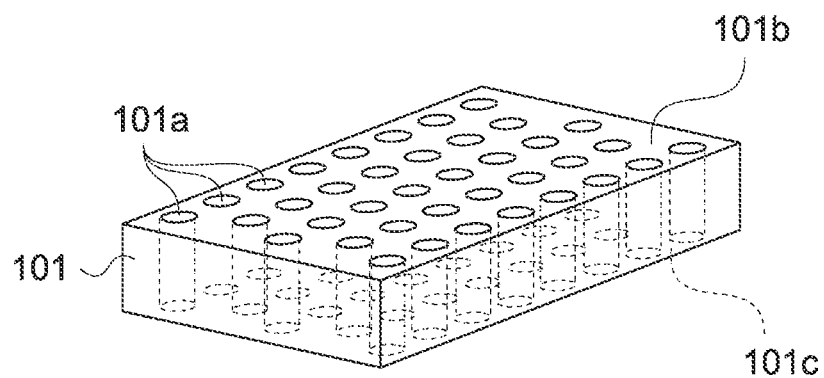
FIG. 3 is a perspective view showing a dielectric layer of the capacitor.
Figure 4:
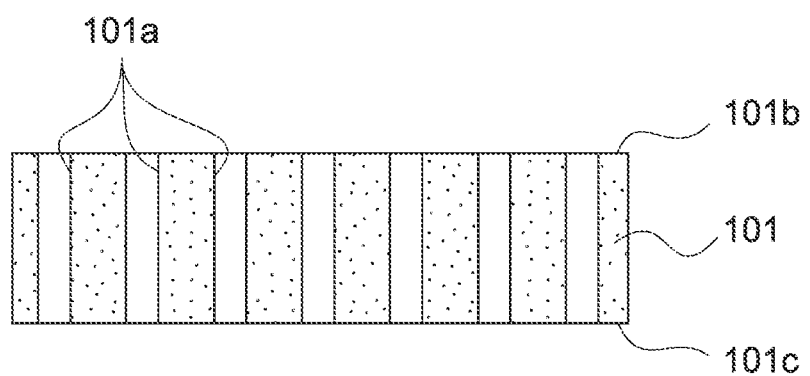
FIG. 4 is a cross-sectional view showing the dielectric layer of the capacitor.

FIG. 3 is a perspective view showing the dielectric layer 101. FIG. 4 is a cross-sectional view showing the dielectric layer 101. As shown in these figures, the through-holes 101*a* are formed in the dielectric layer 101. A plane in parallel with a layer plane direction of the dielectric layer 101 is defined as a first plane 101*b*, and an opposite plane thereof is defined as a second plane 101*c*. The respective through-holes 101*a* are formed along a direction perpendicular to the first plane 101*b* and the second plane 101*c* (thickness direction of the dielectric layer 101), and are communicated with the first plane 101*b* and the second plane 101*c*.

It should be noted that the number and size of the through-holes 101*a* shown in FIG. 3 or the like are illustrative. In practice, the through-holes 101*a* may be smaller and more numerous.

As shown in FIG. 2, the first external electrode layer 102 is disposed on the first plane 101*b* of the dielectric layer 101. The first external electrode layer 102 may be made of a conductive material, e.g., a pure metal such as Cu, Ni, Cr, Ag, Pd, Fe, Sn, Pb, Pt, Ir, Rh, Ru, Al and Ti or an alloy thereof. The thickness of the first external electrode layer 102 may be several tens nm to several µm, for example. Also, the first external electrode layer 102 may be disposed such that a plurality of conductive material layers are laminated.

As shown in FIG. 2, the second external electrode layer 103 is disposed on the second plane 101*c* of the dielectric layer 101. The second external electrode layer 103 may be made of the same conductive material as that of the first external electrode layer 102. The thickness of the second external electrode layer 103 may be several nm to several µm. The constituent material of the second external electrode layer 103 may be the same or different as/from the constituent material of the first external electrode layer 102. Also, the second external electrode layer 103 may be disposed such that a plurality of conductive material layers are laminated.

The first internal electrodes 104 function as one of counter electrodes of the capacitor 100. As shown in FIG. 2, the first internal electrodes 104 are formed such that they are housed in the through-holes 101*a*, and are connected to the first external electrode layer 102. Moreover, the first internal electrodes 104 are formed such that they are separated from the second external electrode layer 103, and are insulated from the second external electrode layer 103. Moreover, in a gap between the first internal electrode 104 and the second external electrode layer 103, an insulator (not shown) may be filled. It should be noted that although the first internal electrodes 104 and the second internal electrodes 105 shown in FIG. 2 or the like are drawn alternately, they are illustrative and do not have to be disposed alternately in practice.

Figure 5:
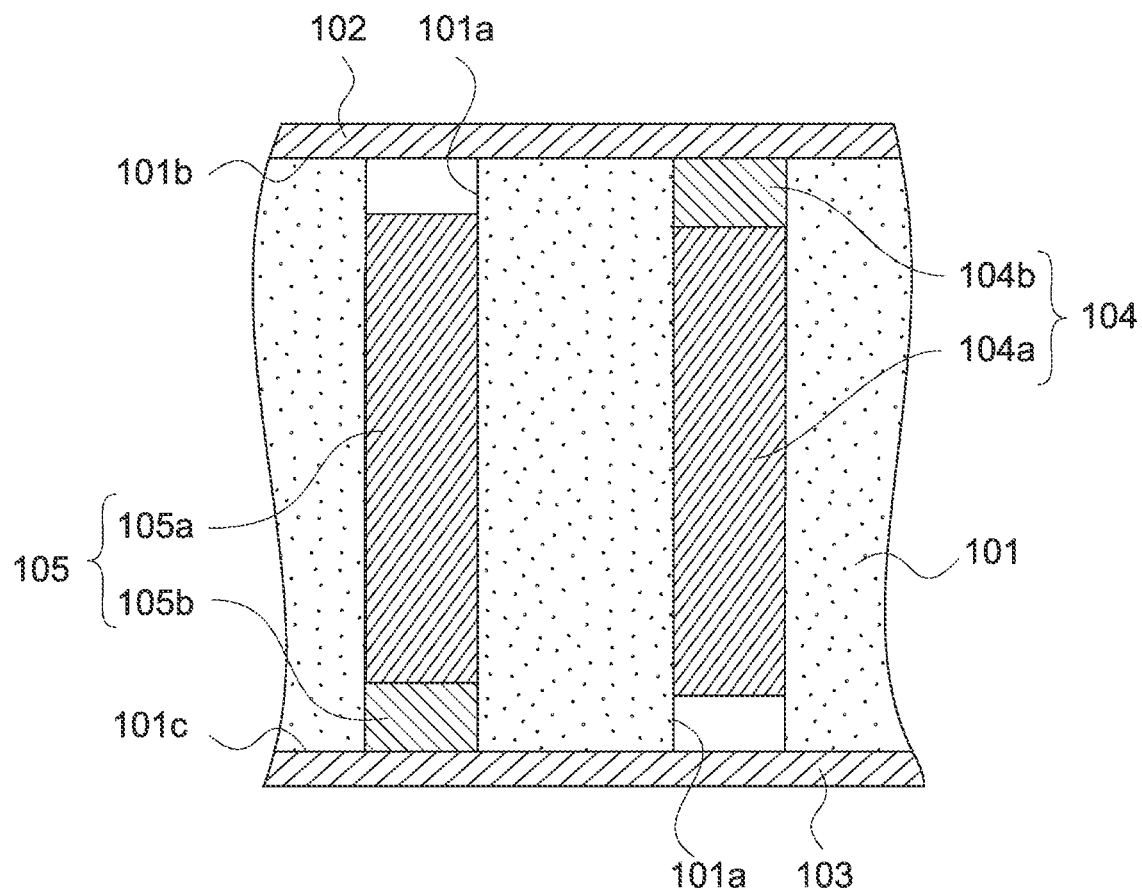
FIG. 5 is a schematic diagram showing a first internal electrode and a second internal electrode of the capacitor.

FIG. 5 is an enlarged view showing the first internal electrode 104 and the second internal electrode 105. As shown in FIG. 5, the first internal electrode 104 has two portions of a first electrode portion 104*a* and a second electrode portion 104*b*. The first electrode portion 104*a* and the second electrode portion 104*b* have different conductive materials.

The first electrode portion 104*a* is a portion of the first internal electrode 104 on a side of the second external electrode layer 103, and is connected to the first external electrode layer 102 via the second electrode portion 104*b*. As shown in FIG. 5, the first electrode portion 104*a* favorably has a length (thickness direction of the dielectric layer 101) that covers most (e.g., about 90%) of the first internal electrode 104. Hereinafter, the constituent material of the first electrode portion 104*a* is assumed to be the first conductive material. The first conductive material will be described later in detail.

The second electrode portion 104*b* is a portion of the first internal electrode 104 on a side of the first external electrode layer 102, and connects the first electrode portion 104*a* with the first external electrode layer 102. As shown in FIG. 5, the second electrode portion 104*b* favorably has a length (thickness direction of the dielectric layer 101) that covers not most but a part (e.g., about 10%) of the first internal electrode 104. Hereinafter, the constituent material of the second electrode portion 104*b* is assumed to be the second conductive material. The second conductive material will be described later in detail.

The second internal electrodes 105 function as other counter electrodes of the capacitor 100. As shown in FIG. 2, the second internal electrodes 105 are formed such that they are housed in the through-holes 101*a*, and are connected to the second external electrode layer 103. Moreover, the second internal electrodes 105 are formed such that they are separated from the first external electrode layer 102, and are insulated from the first external electrode layer 102. Moreover, in a gap between the second internal electrode 105 and the first external electrode layer 102, an insulator (not shown) may be filled.

As shown in FIG. 5, the second internal electrode 105 has two parts of a third electrode portion 105*a* and a fourth electrode portion 105*b*. The third electrode portion 105*a* and the fourth electrode portion 105*b* are formed of different conductive materials.

The third electrode portion 105*a* is a portion of the second internal electrode 105 on a side of the first external electrode layer 102, and is connected to the second external electrode layer 103 via the fourth electrode portion 105*b*. As shown in FIG. 5, the third electrode portion 105*a* favorably has a length (thickness direction of the dielectric layer 101) that covers most (e.g., about 90%) of the second internal electrode 105. Hereinafter, the constituent material of the third electrode portion 105*a* is assumed to be the third conductive material. The third conductive material will be described later in detail.

The fourth electrode portion 105*b* is a portion of the second internal electrode 105 on a side of the second external electrode layer 103, and connects the third electrode portion 105*a* with the second external electrode layer 103. As shown in FIG. 5, the fourth electrode portion 105*b* favorably has a length (thickness direction of the dielectric layer 101) that covers not most but a part (e.g., about 10%) of the second internal electrode 105. Hereinafter, the constituent material of the fourth electrode portion 105*b* is assumed to be the fourth conductive material. The fourth conductive material will be described later in detail.

The capacitor 100 has such a configuration. The first internal electrode 104 faces the second internal electrode 105 via the dielectric layer 101 to form a capacitor. Specifically, the first internal electrode 104 and the second internal electrode 105 function as counter electrodes (positive electrode or negative electrode) of a capacitor. It should be noted that either the first internal electrode 104 or the second internal electrode 105 may be a positive electrode. The first internal electrode 104 and the second internal electrode 105 are connected to wirings to the outside or terminals via the first external electrode layer 102 and the second external electrode layer 103, respectively.

Regarding Material of Internal Electrode

As described above, the first internal electrode 104 has the first electrode portion 104*a* formed of the first conductive material and the second electrode portion 104b formed of the second conductive material as a form. The second internal electrode 105 has the third electrode portion 105a formed of the third conductive material and the fourth electrode portion 105b formed of the fourth conductive material as a form. FIG. 6 is a table showing elements that can be used as the first conductive material, the second conductive material, the third conductive material, and the fourth conductive material, and the physical properties.

It should be noted that the first conductive material and the third conductive material may be the same material or different materials. Also, the second conductive material and the fourth conductive material may be the same material or different materials.

As shown in FIG. 6, the first conductive material and the third conductive material may include at least one element selected from the group consisting of Cu (copper), Ni (nickel), Au (gold), Ag (silver), Pt (platinum), Pd (palladium), Co (cobalt), Cr (chromium, Fe (iron), and Zn (zinc). Specifically, the first conductive material and the third conductive material may include a pure metal of any one of the above-mentioned elements or an alloy including at least one of the above-mentioned elements.

Moreover, the first conductive material and the third conductive material favorably have small electrical resistances. As described above, the first internal electrode 104 and the second internal electrode 105 each include two types of materials. By increasing the lengths of the first electrode portion 104a and the third electrode portion 105a and using materials having small electrical resistances to form the portions 104a and 105b after materials of the second electrode portion 104b and the fourth electrode portion 105b are determined so as to obtain the effects to be described later, it is possible to reduce the element resistance (ESR characteristics) of the capacitor 100. As described above, the first conductive material favorably has a smaller electrical resistance than the second conductive material, and the third conductive material favorably has a smaller electrical resistance than the fourth conductive material. Furthermore, although it will be described in a method of producing the capacitor 100 to be described later, the first conductive material and the third conductive material can favorably be formed through a plating process.

The second conductive material has a smaller Young's modulus (longitudinal elastic modulus) than the first conductive material, and the fourth conductive material has a smaller Young's modulus than the third conductive material. As shown in FIG. 6, the second conductive material and the fourth conductive material may include at least one element selected from the group consisting of In (indium), Sn (tin), Pb (lead), Cd (cadmium), Bi (bismuth), and Al (aluminum). Specifically, the second conductive material and the fourth conductive material may include a pure metal of any one of the above-mentioned elements or an alloy including at least one of the above-mentioned elements.

Moreover, the second conductive material and the fourth conductive material are not limited to a metal or an alloy, and may be a conductive polymer. In particular, a conductive polymer that can be electropolymerized is suitable for the second and fourth conductive materials. In addition thereto, the second conductive material and the fourth conductive material may be a polymeric material including conductive particles.

Furthermore, the second conductive material and the fourth conductive material favorably have a Young's modulus of not more than 70 GPa. Although the details will be described later, if the second conductive material and the fourth conductive material have a Young's modulus of not more than 70 GPa, it is possible to sufficiently alleviate the stress. As shown in FIG. 6, a pure metal of any one of the above-mentioned elements (In, Sn, Pb, Cd, Bi, and Al) has a Young's modulus of not more than 70 GPa. In addition, although it will be described in a method of producing the capacitor 100 to be described later, the second conductive material and the fourth conductive material can favorably be formed through a plating process.

As described above, the first internal electrode 104 and the second internal electrode 105 may include two types of materials having different Young's moduli as a form. Here, Young's moduli may be compared with each other depending on the general physical properties of the elements shown in FIG. 6. This is because the first internal electrode 104 and the second internal electrode 105 can be formed in the through-hole 101a through a plating process under the approximation condition, but it is clear, in view of such a producing process, that values based on general physical properties are shown in the case where Young's moduli of the formed electrode portions are compared with each other.

In the general porous capacitor, stress is caused between the internal electrode and the dielectric layer due to the temperature fluctuation and thus the adhesion between them is decreased to remove the internal electrode in some cases. Because stress is easy to concentrate on both end portions of the internal electrode, the internal electrode is likely to be partially removed. Furthermore, the connection portion with the external electrode layer is disconnected due to the removal on the side connected to the external electrode layer out of both end portions of the internal electrode in some cases. If such removal or disconnection is caused, the capacity value is reduced and thus such a problem that the tolerance of the capacity value as a capacitor product, i.e., ±5%, is not satisfied may be caused.

However, in the capacitor 100 according to this embodiment, the first electrode portion 104a and the first external electrode layer 102 are connected to each other by the second electrode portion 104b formed of the second conductive material having a small Young's modulus (i.e., soft). Also, the third electrode portion 105a and the second external electrode layer 103 are connected to each other by the fourth electrode portion 105b formed of the fourth conductive material having a small Young's modulus. Accordingly, it is possible to alleviate the thermal stress by the second electrode portion 104b or the fourth electrode portion 105b, and to prevent the above-mentioned problem from being caused (see examples).

On the other hand, a conductive material having a small Young's modulus generally has a large electrical resistance. Therefore, if the internal electrode includes only a conductive material having a small Young's modulus, the resistance value (ESR characteristics) of the capacitor is increased and thus the element characteristics may be damaged.

However, in the capacitor 100 according to this embodiment, the second electrode portion 104b and the fourth electrode portion 105b, which are formed of conductive materials having small Young's moduli, constitute only a part of the first internal electrode 104 and a part of the second internal electrode 105, respectively. Most of the first internal electrode 104 and the second internal electrode 105 includes the first electrode portion 104a and the third electrode portion 105a, which have large Young's moduli (small electrical resistances), respectively. Accordingly, the influence on the EST characteristics due to using of a conductive material having a small Young's modulus can be prevented.

It should be noted that either the first internal electrode 104 or the second internal electrode 105 may include two types of materials having different Young's moduli. Such a configuration is effective when the capacitor 100 has the direction that is easy to be influenced by the temperature fluctuation (e.g., when one surface of the capacitor 100 is soldered).

Effects of Capacitor

As described above, in this embodiment, because the first internal electrode 104 and the second internal electrode 105 are made of two types of conductive materials having different Young's moduli, a high-quality capacitor is attained without damaging the element capacity value characteristics with respect to thermal history, for example.

Method of Producing Capacitor

A method of producing the capacitor 100 according to this embodiment will be described.

It should be noted that the producing method described below is only illustrative, and the capacitor 100 may be produced by a producing method different from the producing method described below. FIGS. 7 to 14 are schematic diagrams showing a method of producing the capacitor 100.

Figure 7A:
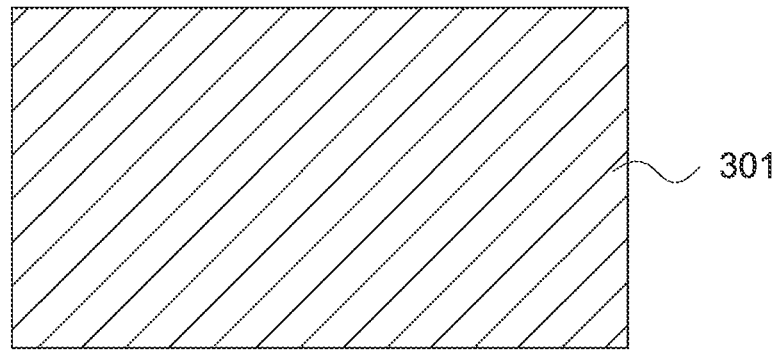
FIGS. 7A, 7B and 7C are each a schematic diagram showing a producing process of the capacitor.

FIG. 7A shows a substrate 301 that will be the dielectric layer 101. In the case where the dielectric layer 101 is made of a metal oxide (e.g., aluminum oxide), the substrate 301 is a metal before oxidation of the metal oxide (e.g., aluminum).

Figure 7B:
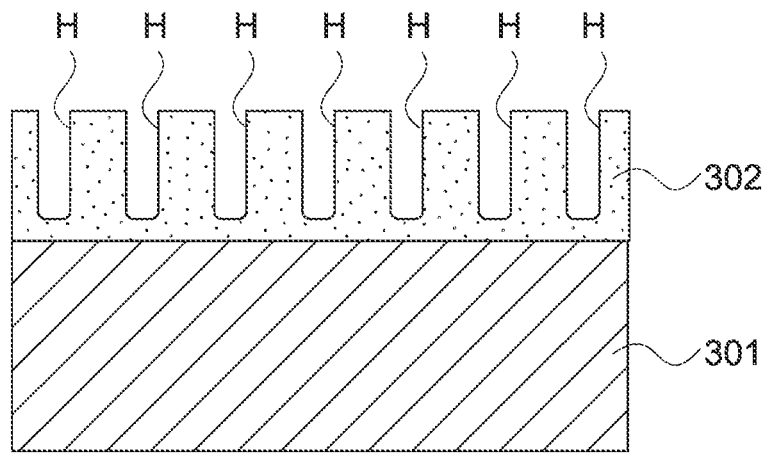

As shown in FIG. 7B, if a voltage is applied to the substrate 301 as an anode in an oxalic acid (0.1 mol/l) solution controlled at a temperature of 15 to 20° C., for example, the substrate 301 is oxidized (anodically oxidized) to form a substrate oxide 302. In this case, by the self-organizing effect of the substrate oxide 302, holes H are formed in the substrate oxide 302. The holes H grow in a direction of oxidation processes, i.e., in a thickness direction of the substrate 301.

It should be noted that regular pits (concave portions) may be formed in the substrate 301 before the anodic oxidation, and the holes H may be caused to grow based on the pits. The pit placement can control the arrangement of the holes H. The pits may be formed by pressing the substrate 301 with a mold, for example.

Figure 7C:
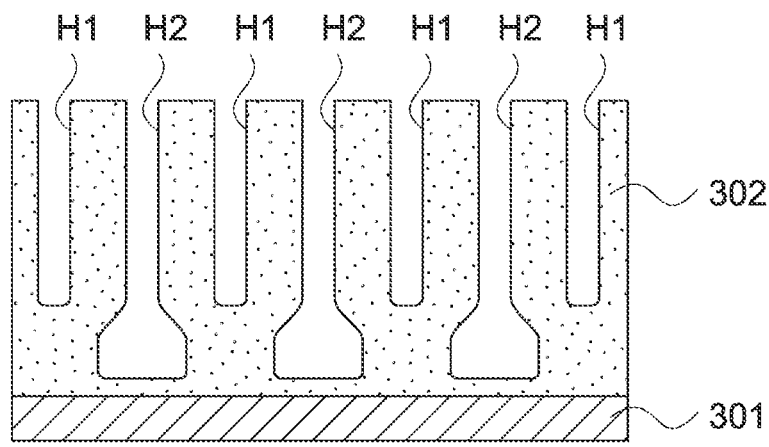

As the predetermined time period is elapsed from the start of the anodic oxidation, the voltage applied to the substrate 301 is increased. Because pitches of the holes H formed by the self-organizing effect are determined depending on the magnitude of the applied voltage, the self-organizing effect proceeds so that the pitches of the holes H are enlarged. In this way, some holes H continue to be formed and enlarged, as shown in FIG. 7C. On the other hand, the formation of other holes H stops due to the enlarged pitches of the holes H. Hereinafter, the holes H where the formation stops are referred to as holes H1, and the holes H where the formation continues (the holes are enlarged) are referred to as holes H2.

The conditions of the anodic oxidation can be set arbitrarily. For example, at a first stage of the anodic oxidation shown in FIG. 7B, the applied voltage can be set to several V to hundreds V and the processing time period can be set to several minutes to several days. The voltage value of the applied voltage can be set to several times greater than that in the first stage and the processing time period can be set to several minutes to several ten minutes at a second stage of the anodic oxidation shown in FIG. 7C.

For example, the holes H each having a hole diameter of 100 nm are formed by setting the applied voltage at the first stage to 40V, and the holes H2 each has an enlarged hole diameter of 200 nm by setting the applied voltage at the second stage to 80V. By limiting the voltage value at the second stage to the above-described range, the number of the holes H1 and the number of the holes H2 can be almost the same. Moreover, by limiting the time period for applying the voltage at the second stage within the above-described range, the thickness of the substrate oxide 302 under the holes H2 formed by applying the voltage at the second stage can be decreased, while a pitch enlargement of the holes H2 is fully achieved. Because the bottom portion of the substrate oxide 302 obtained by applying the voltage at the second stage is removed at a later process, it is desirable that the bottom portion is as thin as possible.

Figure 8A:
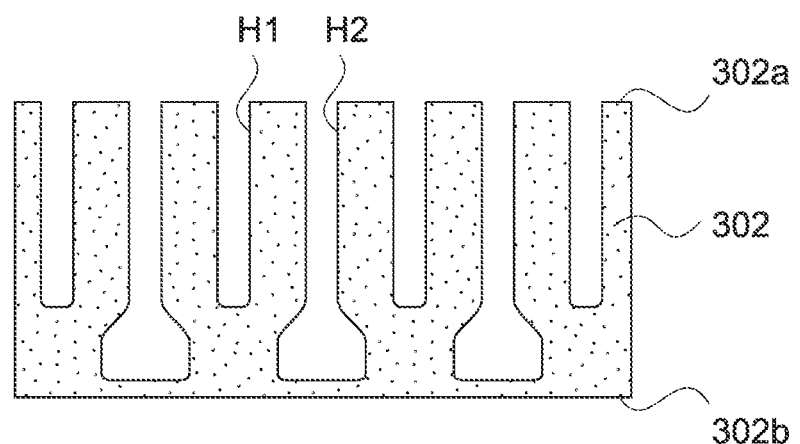
FIGS. 8A, 8B and 8C are each a schematic diagram showing a producing process of the capacitor.

Next, as shown in FIG. 8A, the substrate 301 not oxidized is removed. The removal of the substrate 301 can be made by wet etching, for example. Hereinafter, a surface of the substrate oxide 302 where the holes H1 and H2 are formed is defined as a front surface 302a, and the opposite side thereof is defined as a back surface 302b.

Figure 8B:
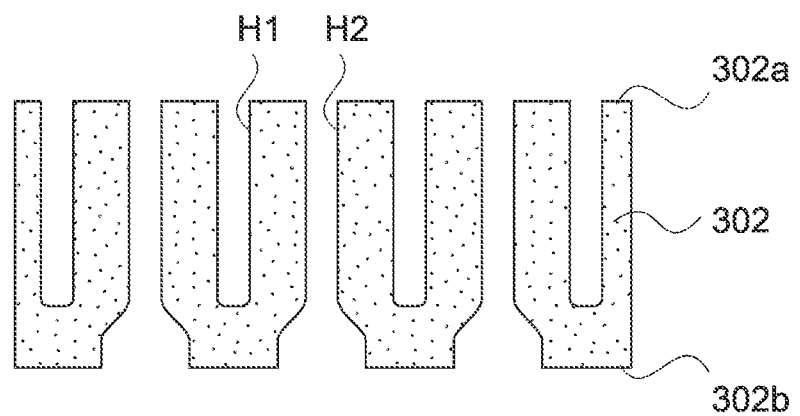

Next, as shown in FIG. 8B, the substrate oxide 302 is removed from the back surface 302b at a predetermined thickness. The removal can be made by a reactive ion etching (RIE). In this case, the substrate oxide 302 is removed to provide a thickness such that the holes H2 are communicated with the back surface 302b but the holes H1 are not communicated with the back surface 302b.

Figure 8C:
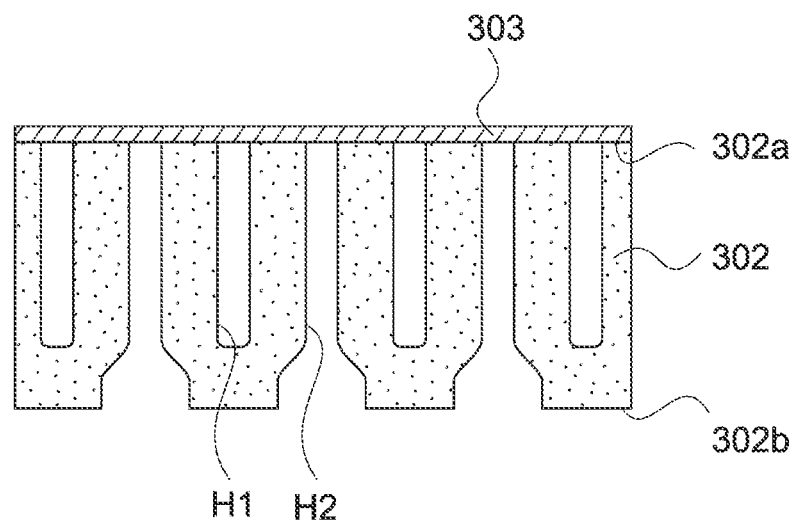

Next, as shown in FIG. 8C, a first conductor layer 303 including the conductive material is formed on the front surface 302a. The first conductor layer 303 can be formed by any method including a sputtering method, a vacuum vapor deposition method, or the like.

Figure 9A:
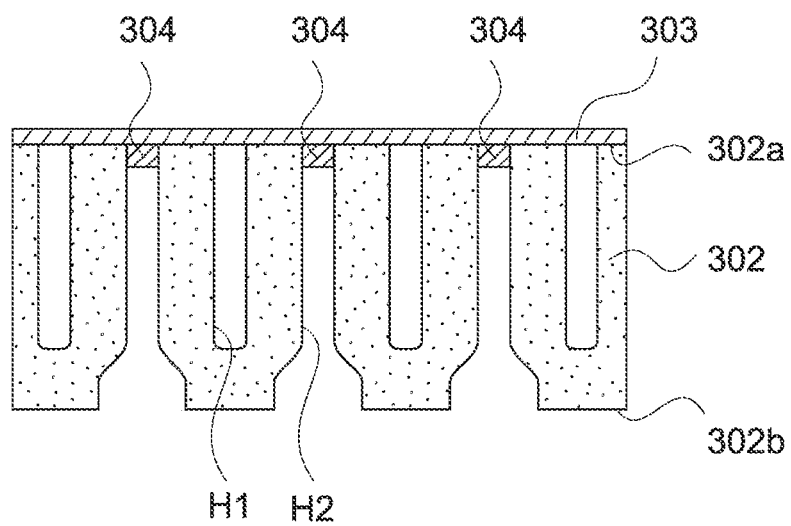
FIGS. 9A, 9B and 9C are each a schematic diagram showing a producing process of the capacitor.

Next, as shown in FIG. 9A, first plating conductors 304 are embedded in the holes H2. The first plating conductors 304 may include the third conductive material. The first plating conductors 304 can be embedded by applying an electrolytic plating process to the substrate oxide 302 using the first conductor layer 303 as a seed layer. Because a plating solution does not enter the holes H1, the first plating conductors 304 are not formed in the holes H1.

Figure 9B:
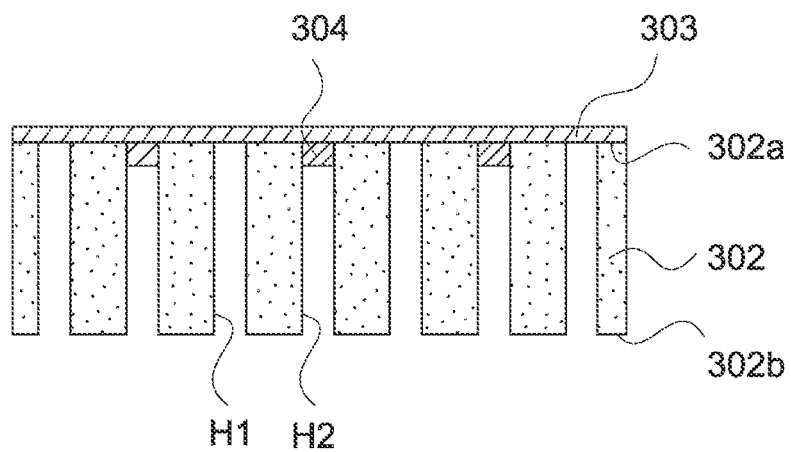

Next, as shown in FIG. 9B, the substrate oxide 302 is removed again from the back surface 302b at a predetermined thickness. The removal can be made by a reactive ion etching.

In this case, the substrate oxide 302 is removed to provide a thickness such that the holes H1 are communicated with the back surface 302b.

Figure 9C:
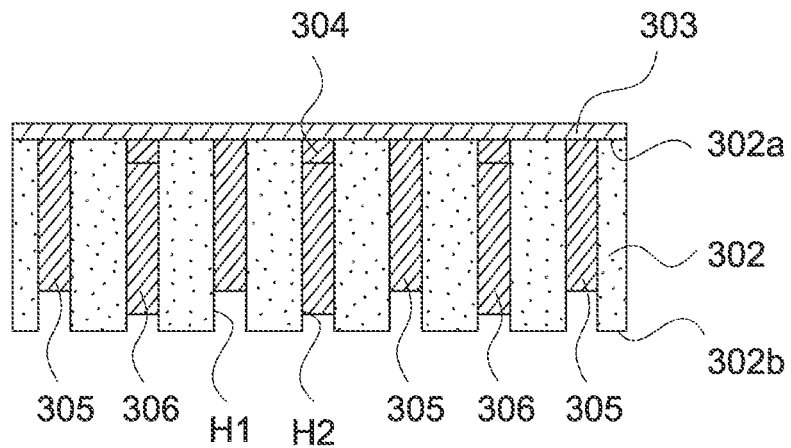

Next, as shown in FIG. 9C, second plating conductors 305 are embedded in the holes H1 and third plating conductors 306 are embedded in the holes H2. The second plating conductors 305 may include the first conductive material, and the third plating conductors 306 may include the third conductive material. It should be noted that according to the producing process, although the first conductive material is the same as the third conductive material, the first conductive material may be different from the third conductive material by using another producing process.

The second plating conductor 305 and the third plating conductor 306 can be embedded by applying an electrolytic plating process to the substrate oxide 302 using the first conductor layer 303 as a seed layer. In this case, because the first plating conductors 304 are formed in the holes H2 in the preceding process, the tip of the third plating conductors 306 projects more than the tip of the second plating conductors 305. Hereinafter, the first plating conductors 304 and the third plating conductors 306 are collectively referred to as fourth plating conductors 307.

Figure 10A:
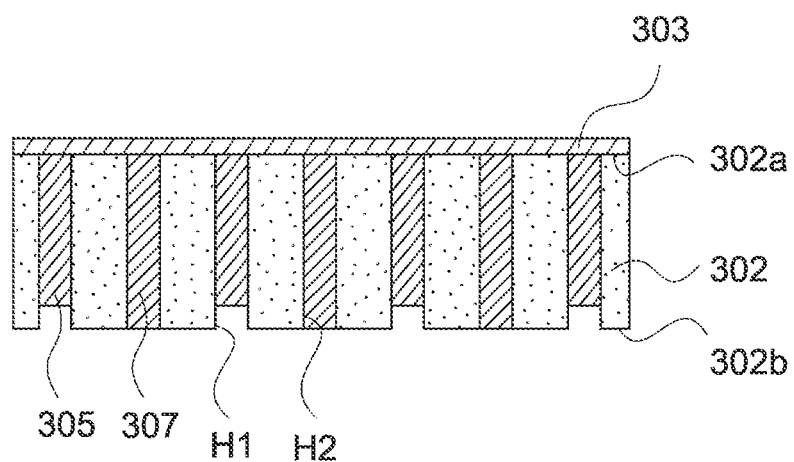
FIGS. 10A, 10B and 10C are each a schematic diagram showing a producing process of the capacitor.

Next, as shown in FIG. 10A, the substrate oxide 302 is removed again from the back surface 302b at a predetermined thickness. The removal can be made by mechanical polishing or the like. In this case, the substrate oxide 302 is removed to provide a thickness such that the fourth plating conductors 307 are exposed to the back surface 302b and the second plating conductors 305 are not exposed to the back surface 302b.

Figure 10B:
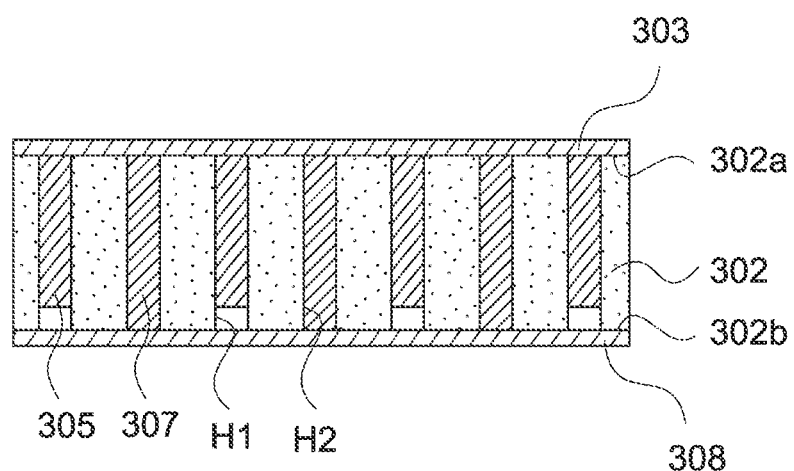

Next, as shown in FIG. 10B, a second conductor layer 308 including a conductive material is formed on the back surface 302b. The second conductor layer 308 can be formed by any method including a sputtering method, a vacuum vapor deposition method, or the like.

Figure 10C:
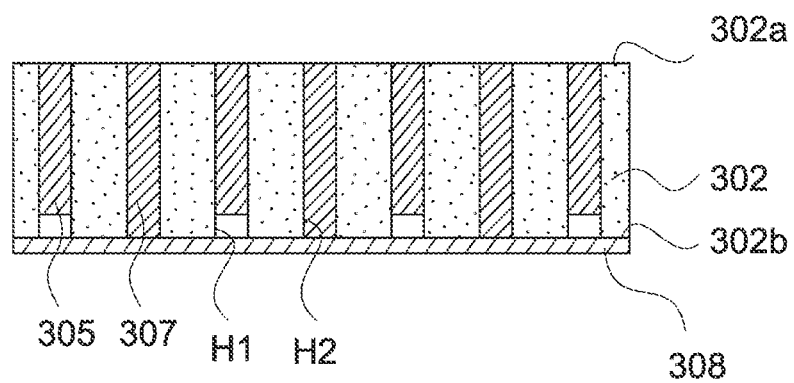

Next, as shown in FIG. 10C, the first conductor layer 303 is removed. The removal of the first conductor layer 303 can be made by a wet etching method, a dry etching method, an ion milling method, a chemical mechanical polishing (CMP) method, or the like.

Figure 11A:
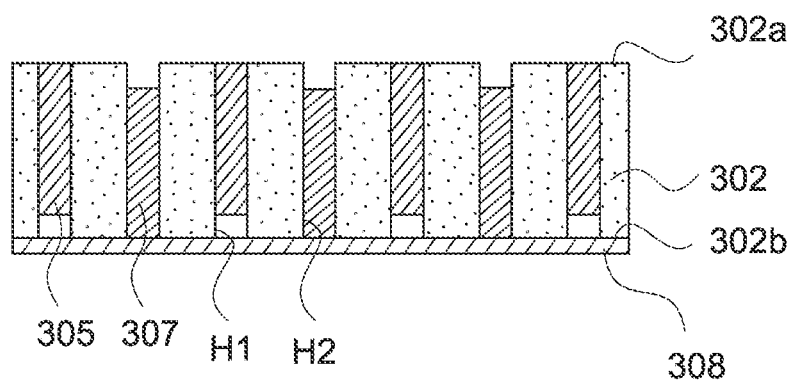
FIGS. 11A, 11B and 11C are each a schematic diagram showing a producing process of the capacitor.

Next, as shown in FIG. 11A, electrolytic etching is applied to the substrate oxide 302 using the second conductor layer 308 as a seed layer. Because the fourth plating conductors 307 are electrically connected to the second conductor layer 308, the fourth plating conductors 307 are etched by the electrolytic etching. Accordingly, gaps in the holes H2 are formed by the removal of the plating conductors 307. On the other hand, because the second plating conductors 305 are not electrically connected to the second conductor layer 308, the second plating conductors 305 are not etched by the electrolytic etching.

Figure 11B:
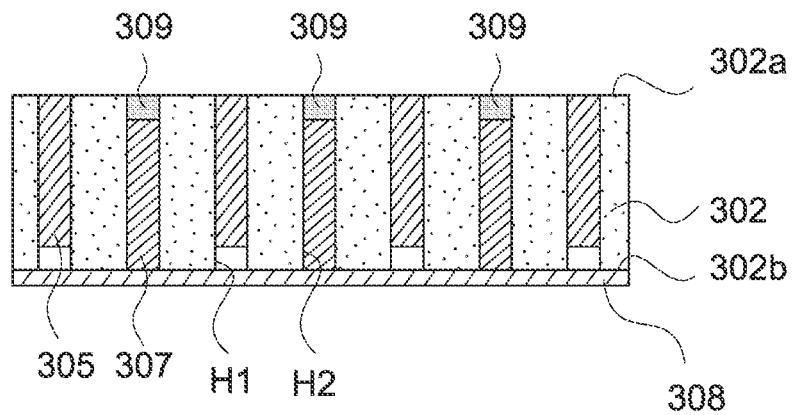

Next, as shown in FIG. 11B, insulators 309 are embedded in the gaps of the holes H2. The insulators 309 can be embedded by filling the gaps with any insulating material.

Figure 11C:
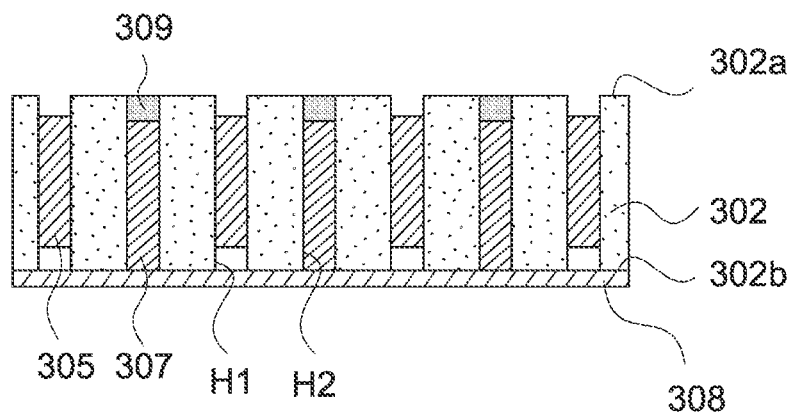

Next, as shown in FIG. 11C, the second plating conductors 305 are etched from the side of the front surface 302a. The fourth plating conductors 307 are prevented from being etched by the insulators 309.

Figure 12A:
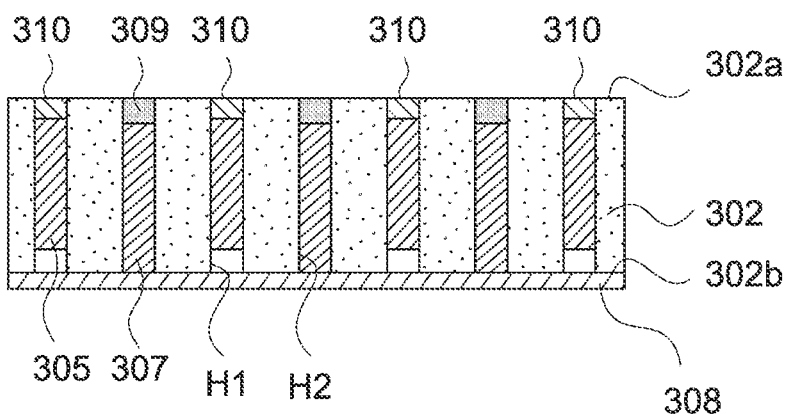
FIGS. 12A, 12B and 12C are each a schematic diagram showing a producing process of the capacitor.

Next, as shown in FIG. 12A, fifth plating conductors 310 are embedded in the holes H1. The fifth plating conductors 310 may include the second conductive material. The fifth plating conductors 310 can be embedded by applying electroless plating to the substrate oxide 302. Because the fourth plating conductors 307 are covered by the insulators 309, the fourth plating conductors 307 are not plated.

Figure 12B:
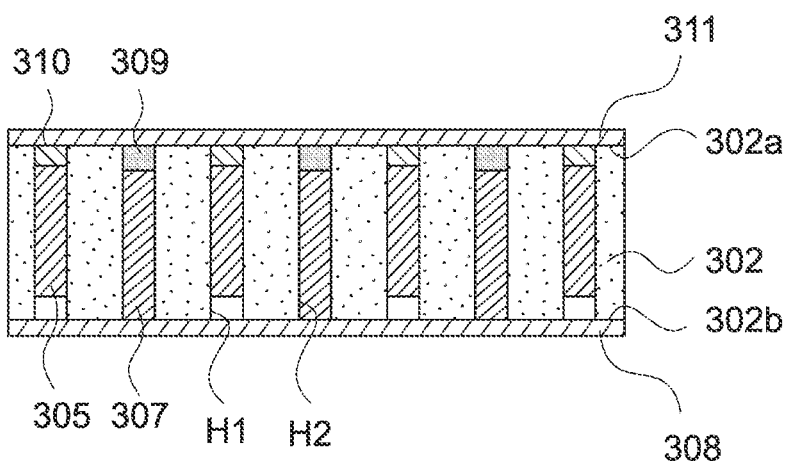

Next, as shown in FIG. 12B, a third conductor layer 311 including a conductive material is formed on the front surface 302a. The third conductor layer 311 may be formed by any method including a sputtering method, a vacuum vapor deposition method, or the like.

Figure 12C:
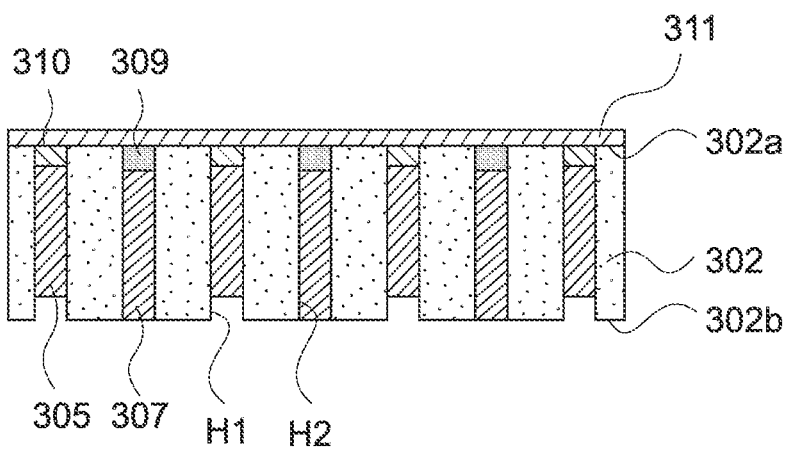

Next, as shown in FIG. 12C, the second conductor layer 308 is removed. The removal of the second conductor layer 308 can be made by a wet etching method, a dry etching method, an ion milling method, a CMP method, or the like.

Figure 13A:
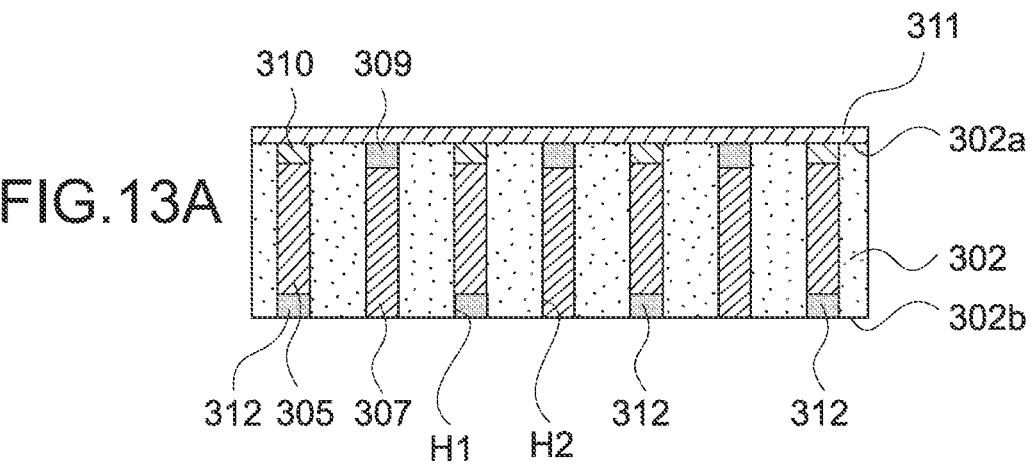
FIGS. 13A, 13B and 13C are each a schematic diagram showing a producing process of the capacitor.

Next, as shown in FIG. 13A, insulators 312 are embedded in the gaps of the holes H1. The insulators 312 can be embedded by filling the gaps with any insulating material. It should be noted that after that, if a fourth conductor layer 314 including a conductive material is formed on the back surface 302b by a wet etching method, a dry etching method, an ion milling method, a CMP method, or the like as shown in FIG. 14, it is possible to achieve the configuration of a capacitor in which only the first internal electrode has excellent thermal stress resistance.

Figure 13B:
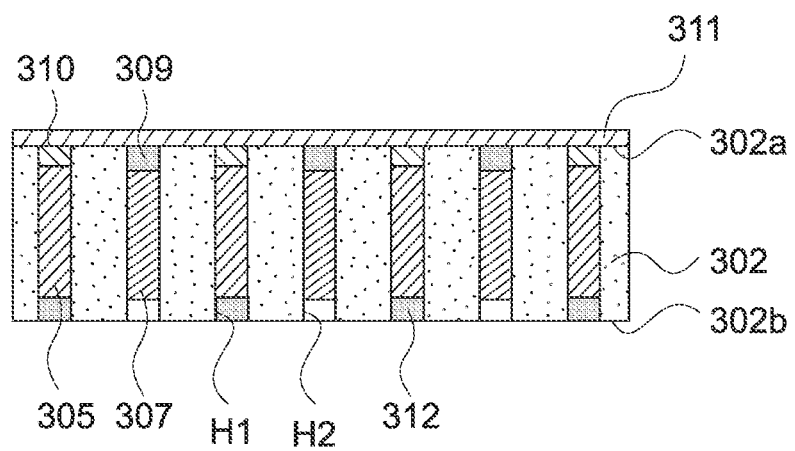

Next, as shown in FIG. 13B, the fourth plating conductors 307 are etched from the side of the back surface 302b. The second plating conductors 305 are prevented from being etched by the insulators 312.

Figure 13C:
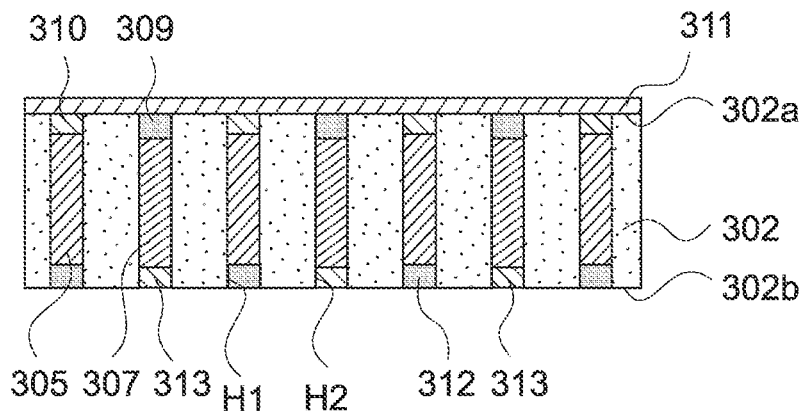

Next, as shown in FIG. 13C, sixth plating conductors 313 are embedded in the holes H2. The sixth plating conductors 313 may include the fourth conductive material. The sixth plating conductors 313 can be embedded by applying electroless plating to the substrate oxide 302. Because the second plating conductors 305 are covered by the insulators 312, the second plating conductors 305 are not plated.

Figure 14:
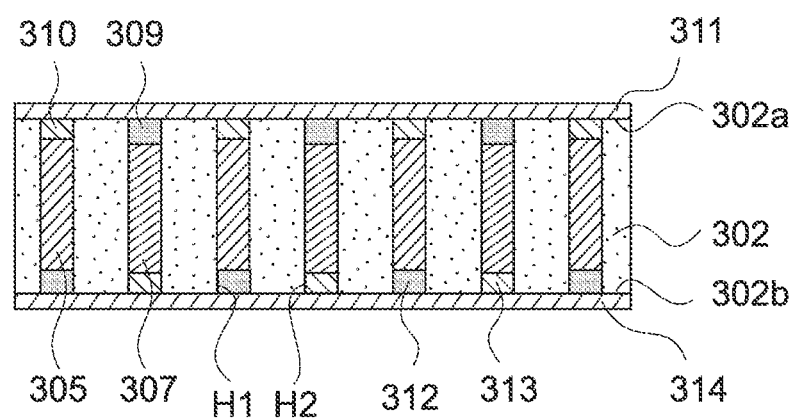
FIG. 14 is a schematic diagram showing a producing process of the capacitor.

Next, as shown in FIG. 14, the fourth conductor layer 314 including a conductive material is formed on the back surface 302b. The fourth conductor layer 314 may be formed by any method including a sputtering method, a vacuum vapor deposition method, or the like.

In this way, the capacitor 100 can be produced. It should be noted that the substrate oxide 302, the third conductor layer 311, and the fourth conductor layer 314 correspond to the dielectric layer 101, the first external electrode layer 102, and the second external electrode layer 103, respectively. Moreover, the second plating conductor 305, the fifth plating conductor 310, the fourth plating conductor 307, and the sixth plating conductor 313 correspond to the first electrode portion 104a, the second electrode portion 104b, the third electrode portion 105a, and the fourth electrode portion 105b, respectively. It should be noted that the insulators 309 and the insulators 312 are not shown in FIGS. 2 and 5.

Modified Example of Capacitor

A modified example of the capacitor 100 according to this example will be described.

As described above, the capacitor 100 according to this embodiment includes the first internal electrode 104 connected to the first external electrode layer 102 and the second internal electrode 105 connected to the second external electrode layer 103, and these internal electrodes each have two electrode portions.

However, either the first internal electrode 104 or the second internal electrode 105 may have two electrode portions. Even in this case, the internal electrode having two electrode portions has improved thermal stress resistance. For example, in the case where the temperature fluctuation due to the thermal conduction on the side of the soldering when the capacitor 100 is soldered is large, only the internal electrode on the side of the soldering may have two electrode portions. Moreover, only some of the first internal electrodes 104 or some of the second internal electrode 105 may have two electrode portions.

Figure 15:
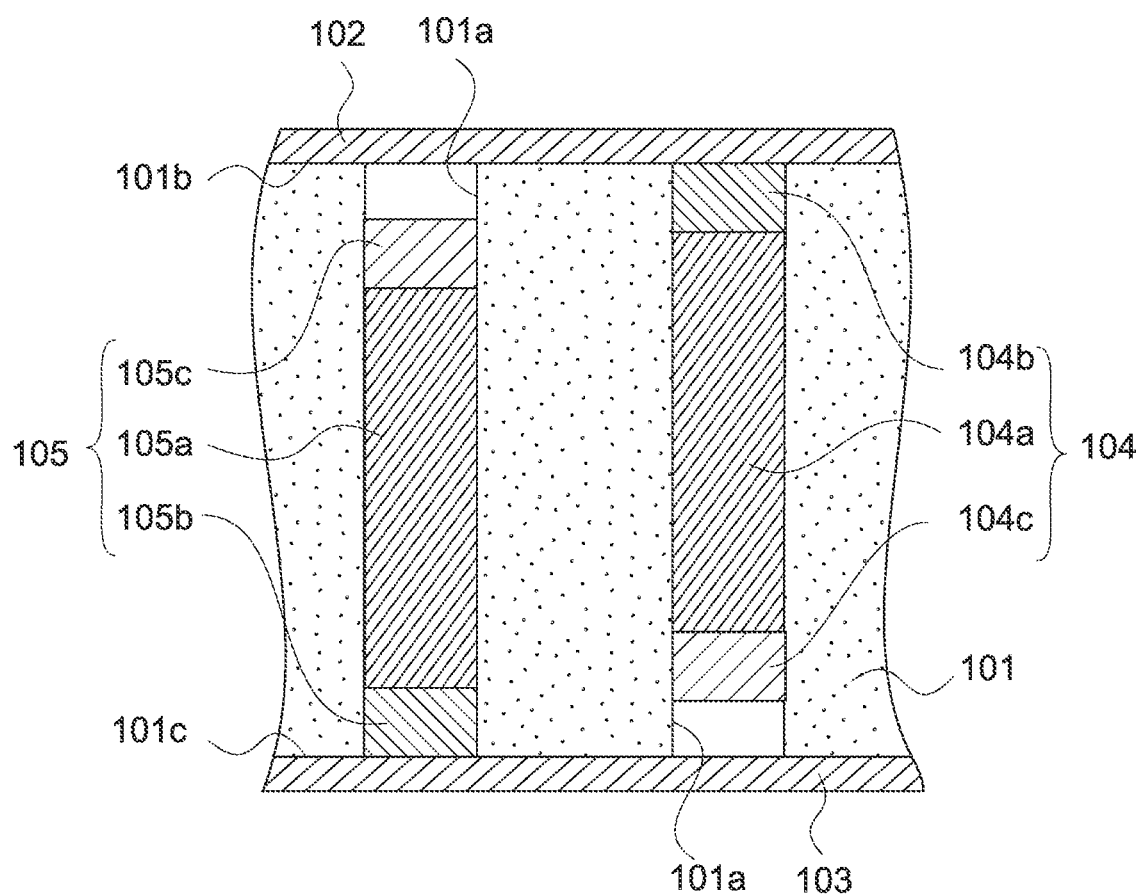
FIG. 15 is a schematic diagram showing the first internal electrode and the second internal electrode of the capacitor according to a modified example of the embodiment of the present disclosure.

Moreover, the first internal electrode 104 and the second internal electrode 105 may have three or more electrode portions. FIG. 15 is a schematic diagram showing the first internal electrode 104 and the second internal electrode 105 of the capacitor 100 according to this modified example.

As shown in FIG. 15, the first internal electrode 104 has not only the first electrode portion 104a and the second electrode portion 104b but a fifth electrode portion 104c. The fifth electrode portion 104c is connected to the first electrode portion 104a. Moreover, the second internal electrode 105 has not only the third electrode portion 105a and the fourth electrode portion 105b but a sixth electrode portion 105c. The sixth electrode portion 105c is connected to the third electrode portion 105a.

The fifth electrode portion 104c and the sixth electrode portion 105c may be formed of conductive materials having smaller Young's moduli than the first electrode portion 104a and the third electrode portion 105a, respectively, i.e., materials selected from the group consisting of the second conductive material and the fourth conductive material shown in FIG. 6. With such a configuration, because removal is not likely to occur at the fifth electrode portion 104c of the first internal electrode 104 and the sixth electrode portion 105c of the second internal electrode 105, it is possible to further prevent the capacity value from being reduced.

Moreover, the fifth electrode portion 104c and the sixth electrode portion 105c may be formed of conductive materials having larger electrical resistances than the first electrode portion 104a and the third electrode portion 105a, respectively, e.g., metal materials having relatively large resistivities such as Pt (platinum) and nichrome, and conductive polymers that can be electropolymerized. With such a configuration, in the case where insulation breakdown occurs at the tip of the first internal electrode 104 or the second internal electrode 105, it is possible to cause the fifth electrode portion 104c or the sixth electrode portion 105c to act as a protection resistance provided in the overcurrent path in series.

As described above, the first internal electrode 104 and the second internal electrode 105 are insulated by a gap or insulator from the first external electrode layer 102 or the second external electrode layer 103. Therefore, an electric field concentrates on the tip of these internal electrodes and insulation breakdown is easy to occur on the tip. Thus, insulating properties of the element are mainly due to the insulating properties of the dielectric layer 101 in the vicinity of the tip of the internal electrodes. Because a mode of destruction is short-circuit, overcurrent flows when insulation breakdown occurs. Therefore, a peripheral element of a circuit on which the capacitor 100 is mounted may be damaged.

Here, by providing the fifth electrode portion 104c and the sixth electrode portion 105c, which are formed of conductive materials having larger electrical resistances than the first electrode portion 104a and the third electrode portion 105a, respectively, it is possible to prevent insulation breakdown from occurring at these electrode portions (i.e., tip portion of the internal electrodes). Moreover, even if insulation breakdown occurs, it is possible to prevent the overcurrent due to such insulation breakdown by the action of the fifth electrode portion 104c and the sixth electrode portion 105c as protect resistance. In addition, in the respective internal electrodes, the fifth electrode portion 104c or the sixth electrode portion 105c is only partially provided. This aims to prevent the resistance value (ESR characteristics) of the capacitor from being affected by high electrical resistances of the fifth electrode portion 104c and the sixth electrode portion 105c, and to prevent the ESR characteristics of the element from being reduced.

It should be noted that the fifth electrode portion 104c and the sixth electrode portion 105c can be formed by plating the first internal electrode 104 or the second internal electrode 105 with a material in the state where the electrode is exposed, in the above-mentioned process of producing the capacitor 100. For example, it is possible to form the fifth electrode portion 104c and the sixth electrode portion 105c after the process shown in FIG. 11A or FIG. 12C immediately before the insulators are formed.

Example

Various types of capacitors were created, and the capacity value fluctuation was confirmed by experiments. FIGS. 16 and 17 are tables showing the structure of capacitors according to examples and comparative examples, and the experimental results.

In FIGS. 16 and 17, capacitors according to examples 1 to 12 each have the structure described in the above-mentioned embodiment. Specifically, in the structure, the first internal electrode has the first electrode portion and the second electrode portion, and the second internal electrode has the third electrode portion and the fourth electrode portion. FIGS. 16 and 17 show the materials of the first electrode portion, the second electrode portion, the third electrode portion, and the fourth electrode portion. It should be noted that capacitors according to comparative examples 1 and 2 each have an internal electrode including a single material.

As shown in FIGS. 16 and 17, in the capacitors according to the examples 1 to 12, the material of the second electrode portion and the fourth electrode portion has a smaller Young's modulus than the material of the first electrode portion and the third electrode portion. Specifically, the capacitors according to the examples 1 to 12 satisfy the magnitude relationship of Young's modulus of the material of each electrode portion shown in the above-mentioned embodiment.

Thousand capacitors according to each of the examples 1 to 12 and the comparative examples 1 and 2 were created, and thermal history assuming soldering is repeated on the capacitors. Specifically, thermal history of 20° C., 260° C., and 20° C. is assumed to be one process, and the capacitors were exposed in the thermal history environment 5 times. The initial capacity value of each capacitor was measured and the thermal history was repeated on the capacitor 5 times before the capacity value of the capacitor was measured again and the number of capacitors in which the fluctuation rate of capacity value was not less than ±5% was counted. Capacity values of thousand capacitors according to each example were measured, and the ratios of capacitors in which the fluctuation rate of capacity value was not less than ±5% were shown in FIGS. 16 and 17. It should be noted that in this experiment, all of the capacitors falling outside the range have the fluctuation rate of not less than −5%.

In the example 1 to 12, almost no capacitor has the fluctuation rate of not less than −5%. On the other hand, in the comparative examples 1 and 2, 1.4% and 1.2% of capacitors have the fluctuation rate of not less than −5%, respectively.

In view of this result, if the internal electrode includes only a conductive material having a high Young's modulus as in the case of the capacitors according to the comparative examples 1 and 2, it is considered that the internal electrode is removed from the dielectric layer due to the burden of the thermal history and the internal electrode is disconnected from the external electrode layer, thereby increasing the capacity value fluctuation. On the other hand, by disposing a conductive material having a small Young's modulus at a joining portion of the internal electrode and the external electrode layer as in the case of the capacitors according to the examples 1 to 12, it is considered that the internal electrode is prevented from being removed from the dielectric layer and the fluctuation of the capacity value is reduced.

The present disclosure contains subject matter related to that disclosed in Japanese Priority Patent Application JP 2012-266476 filed in the Japan Patent Office on Dec. 5, 2012, the entire content of which is hereby incorporated by reference.

What is claimed is:

1. A capacitor, comprising:
    a dielectric layer having a first plane, a second plane opposite to the first plane, and a plurality of through-holes communicated with the first plane and the second plane;
    a first external electrode layer disposed on the first plane;
    a second external electrode layer disposed on the second plane;
    a first internal electrode having a first electrode portion and a second electrode portion, the first electrode portion being formed of a first conductive material, the second electrode portion being formed of a second conductive material, the second electrode material connecting the first electrode portion with the first external electrode layer, the second conductive material having a smaller Young's modulus than the first conductive material, the first internal electrode being housed in a part of the plurality of through-holes; and
    a second internal electrode housed in another part of the plurality of through-holes, the second internal electrode being connected to the second external electrode layer.

2. The capacitor according to claim 1, wherein
    the second internal electrode includes a third electrode portion and a fourth electrode portion, the third electrode portion being formed of a third conductive material, the fourth electrode portion being formed of a fourth conductive material, the fourth electrode portion connecting the third electrode portion with the second external electrode layer, the fourth conductive material having a smaller Young's modulus than the third conductive material.

3. The capacitor according to claim 2, wherein the second conductive material and the fourth conductive material include at least one element selected from the group consisting of In, Sn, Pb, Cd, Bi, and Al.

4. The capacitor according to claim 3, wherein the first conductive material and the third conductive material include at least one element selected from the group consisting of Cu, Ni, Au, Ag, Pt, Pd, Co, Cr, Fe, and Zn.

5. The capacitor according to claim 4, wherein the second conductive material and the fourth conductive material have a Young's modulus of not more than 70 GPa.

6. The capacitor according to claim 1, wherein the dielectric layer includes a material in which a through-hole is formed by anode oxidation effect.

7. The capacitor according to claim 1, wherein the dielectric layer includes aluminum oxide.

\* \* \* \* \*